(12) United States Patent
Howe

(10) Patent No.: US 10,057,218 B2
(45) Date of Patent: Aug. 21, 2018

(54) NETWORK ADDRESS-BASED ENCRYPTION

(71) Applicant: The Boeing Company, Chicago, IL (US)

(72) Inventor: Wayne R. Howe, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/444,040

(22) Filed: Jul. 28, 2014

(65) Prior Publication Data

US 2016/0028696 A1    Jan. 28, 2016

(51) Int. Cl.
*H04L 29/06* (2006.01)

(52) U.S. Cl.
CPC .......... *H04L 63/0428* (2013.01); *H04L 63/06* (2013.01); *H04L 2463/061* (2013.01)

(58) Field of Classification Search
CPC ..... H04L 63/0428; H04L 63/04; H04L 63/06; H04L 2463/061
USPC ............................... 713/162; 726/26; 380/44
See application file for complete search history.

(56) References Cited

U.S. PATENT DOCUMENTS

| | | | | | |
|---|---|---|---|---|---|
| 4,369,332 | A | * | 1/1983 | Campbell, Jr. ................. | 380/43 |
| 4,993,070 | A | * | 2/1991 | Taylor ........................... | 380/267 |
| 5,822,433 | A | * | 10/1998 | Bottle et al. .................. | 713/155 |
| 6,683,954 | B1 | | 1/2004 | Searle | |
| 8,121,294 | B2 | * | 2/2012 | Ciet et al. ..................... | 380/277 |
| 8,223,673 | B2 | * | 7/2012 | Miriyala ............. H04L 12/1813 | 370/260 |
| 8,700,894 | B2 | * | 4/2014 | Hammell et al. ............. | 713/162 |
| 2002/0146126 | A1 | * | 10/2002 | Smith ........................ | H04L 9/06 380/255 |
| 2003/0191955 | A1 | * | 10/2003 | Wagner ................. | G06F 21/572 713/191 |
| 2004/0073903 | A1 | | 4/2004 | Melchione et al. | |
| 2004/0083362 | A1 | * | 4/2004 | Park et al. .................... | 713/162 |
| 2004/0146164 | A1 | | 7/2004 | Jonas et al. | |
| 2004/0228401 | A1 | * | 11/2004 | Chen ............................. | 375/240 |
| 2005/0125372 | A1 | | 6/2005 | Da Palma et al. | |
| 2006/0078111 | A1 | * | 4/2006 | Hollar .............. | G11B 20/00086 380/201 |
| 2006/0133616 | A1 | * | 6/2006 | Kim et al. ..................... | 380/277 |
| 2006/0177065 | A1 | * | 8/2006 | Halbert ................. | H04L 9/0662 380/277 |
| 2007/0172066 | A1 | * | 7/2007 | Davin ........................... | 380/262 |
| 2007/0189529 | A1 | * | 8/2007 | Hauge .................. | H04N 7/1675 380/200 |
| 2007/0192592 | A1 | * | 8/2007 | Goettfert et al. ............. | 713/162 |
| 2008/0008319 | A1 | * | 1/2008 | Poirier .................. | H04L 9/0866 380/228 |

(Continued)

OTHER PUBLICATIONS

UK Intellectual Property Office, "Combined Search and Examination Report under Sections 17 and 18(3)," GB1513026.3 (2016).

(Continued)

*Primary Examiner* — Sarah Su
(74) *Attorney, Agent, or Firm* — Walters & Wasylyna LLC

(57) ABSTRACT

A system for encrypting data and transferring or storing data securely may include a computing device including an encryptor configured to generate an encryption key from a network resource and encrypt data using the encryption key to generate encrypted data, and a decryptor configured to generate a decryption key from the network resource and decrypt the encrypted data to generate the non-encrypted data.

21 Claims, 6 Drawing Sheets

(56) References Cited

U.S. PATENT DOCUMENTS

| | | | |
|---|---|---|---|
| 2008/0072037 A1* | 3/2008 | Narayanan | H04L 9/3215 |
| | | | 713/156 |
| 2008/0188200 A1* | 8/2008 | Forsberg | H04W 12/04 |
| | | | 455/410 |
| 2008/0263621 A1* | 10/2008 | Austerlitz | H04N 21/43615 |
| | | | 725/139 |
| 2009/0113035 A1 | 4/2009 | Ohashi | |
| 2009/0228714 A1* | 9/2009 | Fiske | G06F 21/32 |
| | | | 713/186 |
| 2010/0228972 A1* | 9/2010 | Wat | G06Q 20/12 |
| | | | 713/163 |
| 2010/0272267 A1* | 10/2010 | Conus | H04N 7/165 |
| | | | 380/281 |
| 2011/0010541 A1* | 1/2011 | Robert et al. | 713/162 |
| 2011/0072279 A1* | 3/2011 | Milliken | G06F 21/71 |
| | | | 713/194 |
| 2011/0154061 A1* | 6/2011 | Chilukuri | G06F 12/1408 |
| | | | 713/193 |
| 2011/0243328 A1* | 10/2011 | Paillier | H04L 9/3073 |
| | | | 380/255 |
| 2011/0302400 A1* | 12/2011 | Maino | G06F 21/575 |
| | | | 713/2 |
| 2012/0030774 A1 | 2/2012 | Keith et al. | |
| 2012/0246462 A1* | 9/2012 | Moroney et al. | 713/151 |
| 2013/0051552 A1* | 2/2013 | Handschuh | G06F 21/602 |
| | | | 380/44 |
| 2013/0066786 A1* | 3/2013 | Joyce | G06Q 20/12 |
| | | | 705/71 |
| 2013/0305037 A1* | 11/2013 | Puttaswamy Naga | H04L 63/0428 |
| | | | 713/152 |
| 2014/0122736 A1* | 5/2014 | Howe et al. | 709/231 |
| 2014/0274178 A1* | 9/2014 | Watanabe | 455/507 |
| 2015/0244520 A1* | 8/2015 | Kariman | H04L 9/0863 |
| | | | 713/168 |
| 2015/0295707 A1 | 10/2015 | Howe et al. | |
| 2015/0295708 A1* | 10/2015 | Howe | H04L 9/0858 |
| | | | 380/28 |
| 2015/0295907 A1* | 10/2015 | Abrahamson | H04L 63/065 |
| | | | 713/150 |
| 2017/0118182 A1* | 4/2017 | Fielder | H04L 63/0428 |

OTHER PUBLICATIONS

Shannon, "Communication Theory of Secrecy Systems," *Bell System Technical Journal*, vol. 28(4), p. 656-715 (1949).

The Intellectual Property Office of the United Kingdom,"Patents Act 1977: Examination Report under Section 18(3)," GB1513026.3 (dated Aug. 25, 2016).

Great Britain Patent Office, Examination Report, Application No. GB 1513026 (dated Apr. 13, 2017).

UK Patent Office, "Patents Act 1977: Search and Examination Report under Sections 17 and 18(3)" (dated Oct. 20, 2017).

https://en.wikipedia.org/wiki/Key_size (first available 2004).

https://en.wikipedia.org/wiki/One-time_pad (first available 2004).

U.K. Intellectual Property Office, Examination Report, Application No. GB1513026.3 (dated Mar. 12, 2018).

Great Britain Patent Office, Examination Report, Application No. GB1513026.3 (dated Feb. 8, 2018).

Nallanthigal R. et al., "Pseudorandom binary key generation from binary files", 2011 International Conference on Computational and Intelligence Networks (CICN), pub. IEEE, pp. 631-634.

\* cited by examiner

NETWORK ADDRESS-BASED ENCRYPTION

FIELD

The present disclosure is generally related to data encryption and decryption and, more particularly, to a system and method for encrypting and decrypting data using an encryption key and decryption key generated (e.g., derived) from a network address or web-based resource.

BACKGROUND

Providing secure transfers of data over the Internet and other communications networks has become increasingly important. One method of securing data transfers includes encrypting and/or decrypting the transferred data using either symmetric (private-key/private-key) or asymmetric (public-key/private-key) encryption and decryption architectures.

Symmetric encryption and decryption uses a single, unique encryption/decryption key to encrypt and decrypt each secure data package. However, in addition to potential complexity, processing overhead, and time delays, symmetric encryption may require the sender to communicate the encryption key to the recipient by various means, such as by electronic or non-electronic methods, which can compromise the security of the transaction.

Asymmetric encryption requires the use of both a public key and a private key, wherein multiple secure data packages are encrypted using the same public key. Asymmetric encryption may compromise the security of transferred data because if an unintended user discovers the private key used to decrypt an encrypted data package, the user will also be able to decrypt all of the data packages encrypted using the public key.

Furthermore, both symmetric and asymmetric encryption/decryption methods are generally based on complex mathematical computation. The more complex the encryption algorithm, the more time and processing power is required to encrypt and decrypt the message by authorized parties. This is a necessary deficiency however, because the more complex the encryption algorithm, the exponentially more time and processing power are required to break the encryption key (e.g., a brute force attack) and decrypt the message by an unauthorized third party. Nevertheless, as the processing power of computers and quantum computers increases, the likelihood of successful encryption breaking increases.

Therefore, there remains a need to increase the relative difficulty of decryption without increasing and/or potentially decreasing the mathematical computational complexity, processing power, and processing time for encryption and decryption.

SUMMARY

In one embodiment, the disclosed computing device may include an encryptor configured to derive an encryption key from a network resource and encrypt data using the encryption key to generate encrypted data.

In one embodiment, the encryption key used to generate the encrypted data may include at least one of an exclusive or encryption scheme, information used to generate the encrypted data, and/or information used to complicate the encrypted data.

In one embodiment, the encryptor may include encryption/decryption software instructions stored on a computer readable storage medium (e.g., non-transitory computer readable storage medium) and executed by a processing unit.

In one embodiment, the encryptor may include a hardwired encryption/decryption module.

In another embodiment, the network resource may include a key size at least as large as the data being encrypted.

In another embodiment, the network resource may include at least one of a web resource, a web-based service, a cloud-based service, a point-of-sale service, an IP address, a server response, a time of day response, a date response, an application, an application service, a process, network-based content, a network-based element, a network-based location, a network-based address, a uniform resource locator, a web page, a web-based data, a network transmission, and/or a one-time pad.

In another embodiment, the disclosed computing device may include a decryptor configured to derive a decryption key from a network resource and decrypt encrypted data using the decryption key to generate non-encrypted data.

In another embodiment, the decryption key used to decrypt the encrypted data may include at least one of an exclusive or decryption scheme, information used to decrypt the encrypted data, and/or information used to uncomplicate the encrypted data.

In another embodiment, the decryptor may include encryption/decryption software instructions stored on a computer readable storage medium (e.g., non-transitory computer readable storage medium) and executed by a processing unit.

In another embodiment, the decryptor may include a hardwired encryption/decryption module.

In another embodiment, the network resource may include a key size at least as large as the data being decrypted.

In another embodiment, the disclosed method may include the steps of (1) generating (e.g., deriving) an encryption key from a network resource, and (2) encrypting data (e.g., non-encrypted data or encrypted data) with the encryption key to generate encrypted data.

In another embodiment, encrypting the data with the encryption key may include encoding the data using at least one of an exclusive or encryption scheme, information to generate the encrypted data, and/or information to complicate the encrypted data.

In another embodiment, the disclosed method may include complicating the non-encrypted data with at least one of mixing, swapping, transposing, transforming, inverting, flipping, adding, inserting, replacing, hashing, and/or deleting bits.

In another embodiment, the network resource may include at least one of a network-based element identified by a network address and a web-based element identified by a web address.

In another embodiment, the disclosed method may include the steps of (1) generating (e.g., deriving) a decryption key (e.g., regenerating the encryption key) from a network resource, and (2) decrypting encrypted data with the decryption key to generate non-encrypted data (e.g., decrypted data).

In another embodiment, decrypting the encrypted data with the decryption key may include decoding the encrypted data with the decryption key using at least one of an exclusive or decryption scheme, information to generate the non-encrypted data, and/or information to uncomplicate the encrypted data.

In another embodiment, the disclosed method may include uncomplicating the encrypted data with at least one of mixing, swapping, transposing, transforming, inverting, flipping, adding, inserting, replacing, hashing, and/or deleting bits.

In another embodiment, the disclosed computing device may include a processing unit and a computer readable storage medium (e.g., non-transitory computer readable storage medium) having a plurality of instructions stored thereon, the plurality of instructions, when executed by the processing unit, causes the processing unit to (1) generate (e.g., derive) an encryption key from a network resource, and (2) encrypt data (e.g., non-encrypted data or encrypted data) with the encryption key to generate encrypted data.

In another embodiment, the plurality of instructions, when executed by the processing unit, further causes the processing unit to encode the data (e.g., non-encrypted data or encrypted data) with the encryption key using at least one of an exclusive or encryption scheme, information to generate the encrypted data, and/or information to complicate the encrypted data.

In another embodiment, the network resource may include at least one of a uniform resource locator, a web page, a web-based data, a network transmission, and a one-time pad.

In another embodiment, the disclosed computing device may include a processing unit and a computer readable storage medium (e.g., non-transitory computer readable storage medium) having a plurality of instructions stored thereon, the plurality of instructions, when executed by the processing unit, causes the processing unit to (1) generate (e.g., derive) a decryption key (e.g., regenerate the encryption key) from a network resource, and (2) decrypt encrypted data with the decryption key to generate non-encrypted data (decrypted data).

In another embodiment, the plurality of instructions, when executed by the processing unit, causes the processing unit to decode the encrypted data with the encryption key using at least one of an exclusive or decryption scheme, information to generate the non-encrypted data, and information to uncomplicate the encrypted data.

In another embodiment, the disclosed system for transferring or storing information securely includes an encryptor configured to derive an encryption key from a first network resource and encrypt data (e.g., non-encrypted data or encrypted data) using the encryption key to generate encrypted data, a decryptor configured to derive a decryption key from a second network resource and decrypt the encrypted data using the decryption key to generate non-encrypted data (e.g., decrypted data), and a network coupled to the encryptor, the decryptor, the first network resource and the second network resource.

In another embodiment, the encryptor uses the network to communicate with the first network resource to generate the encryption key, and the encryptor uses the encryption key to encode the non-encrypted data using at least one of an exclusive or encryption scheme, information to generate the encrypted data, and/or information to complicate the encrypted data to produce the encrypted data.

In another embodiment, the encryptor complicates the data with at least one of mixing, swapping, shifting, transposing, transforming, inverting, flipping, adding, inserting, replacing, hashing, and deleting bits.

In another embodiment, the encryptor transfers the encrypted data to the decryptor.

In another embodiment, the decryptor uses the network to communicate with the second network resource to generate the decryption key, and the decryptor uses the decryption key to decode the encrypted data using at least one of an exclusive or decryption scheme, information to generate the non-encrypted data, and/or information to uncomplicate the encrypted data to produce the non-encrypted data.

In another embodiment, the decryptor uncomplicates the encrypted data with at least one of mixing, swapping, shifting, transposing, transforming, inverting, flipping, adding, inserting, replacing, hashing, and/or deleting bits.

In another embodiment, the first network resource and the second network resource are the same.

In another embodiment, the first network resource and the second network resource are different.

In another embodiment, at least one of the first network resource and the second network resource may include at least one of a network-based element identified by a network address and a web-based element identified by a web address.

In another embodiment, at least one of the first network resource and the second network resource includes at least one of a uniform resource locator, a web page, a web-based data, a network transmission, and/or a one-time pad.

In yet another embodiment, the data may include at least one of a data file and a data stream.

Other embodiments of the disclosed device, system and method will become apparent from the following detailed description, the accompanying drawings and the appended claims.

DETAILED DESCRIPTION

Figure 1:
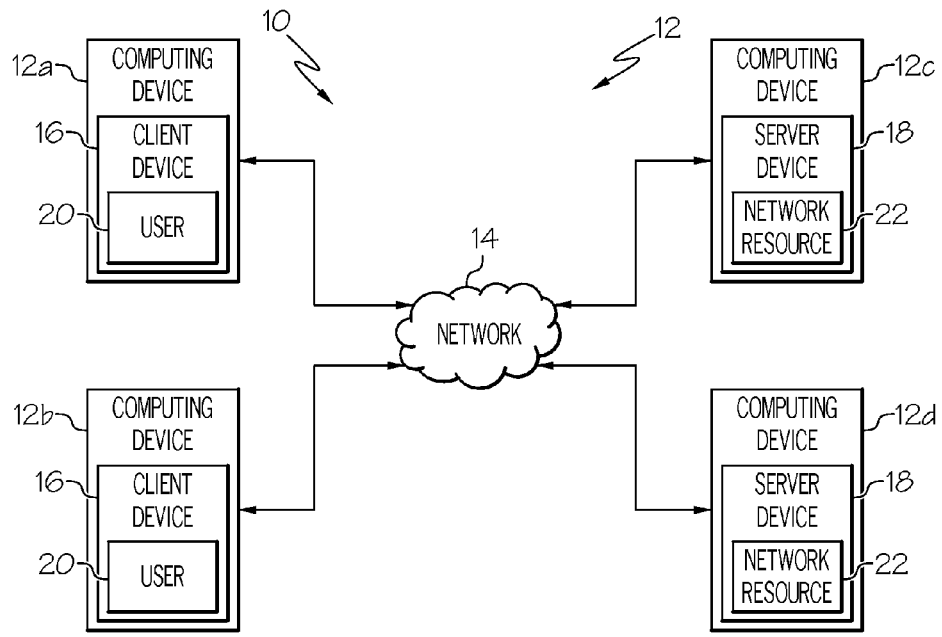
FIG. 1 is a schematic block diagram of one embodiment of the disclosed system for encrypting data.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed system, generally designated 10, for encrypting data, decrypting data, and/or communicating encrypted data (e.g., transmitting or storing information securely) may include a plurality of computing devices 12 (identified individually as computing device 12a, 12b, 12c, 12d). The plurality of computing devices 12 may communicate (e.g., transmit and/or receive) data and/or information to one another. In one embodiment, the plurality of computing devices 12 may be connected together via a network 14. In another embodiment, the plurality of computing devices 12 may be directly connected together. In yet another embodiment of the disclosed system 10, the computing devices 12 may be processors and/or processes using inter-processor and/or inter-process communication, which may be between processors and/or processes directly connected together or across the network 14.

A computing device 12 may include any system, device, and/or combination of systems and/or devices that is able to establish a connection (e.g., a wired, a wireless, an optical, or a cellular connection) to communicate with another system, device and/or combination of systems and/or devices. For example, the computing device 12 may include, but is not limited to, a server, a desktop server, a web server, a cloud-based server, a desktop computer, an airplane computer, a satellite computer, a client computer, a host computer, a point-of-sale device, a computer cluster, a notebook computer, a laptop computer, a handheld computer, a mobile phone (e.g., a smart phone), a personal digital assistant ("PDA"), a tablet PC, or the like.

In one embodiment, the network 14 may be any collection of distinct networks operating wholly or partially in conjunction to provide connectivity to the computing devices 12 and allow communication of data between computer devices 12. For example, the network 14 over which the plurality of computing devices 12 communicate, may include, but is not limited to, the Internet, a telephonic network, a cellular network, a fiber network, a wireless network, a cloud-based network, a military or defense network, a point-of-sale network, a private network (e.g., intranet), a local area network ("LAN"), a wide area network ("WAN"), a personal area network ("PAN"), or a combination thereof. As one example, the network 14 may be a cloud-based environment or a web-based environment. As one specific, non-limiting example, communications may be achieved by a secure communications protocol, such as secure sockets layer ("SSL") or transport layer security ("TLS").

In one embodiment, one or more of the computing devices 12 may be a client device 16 and one or more of the computing devices 12 may be a server device 18 (e.g., a host server). For example, and as illustrated in FIG. 1, computing devices 12a and 12b may be client devices 16 and computing devices 12c and 12d may be server devices 18. As one example, the client device 16 may have an associated user 20. As one example, the server device 18 may host a network resource 22. For example, the network resource 22 may include, but is not limited to, web-based services, cloud-based services, point-of-sale services, Internet Protocol ("IP") addresses, server responses, time of day and/or date responses, applications, application services, processors, processes and/or process servers.

Client devices 16 may communicate with one another over the network 14. Client devices 16 may communicate with server devices 18 over the network 14. Server devices 18 may communicate with one another over the network 14. Thus, communications may be client-to-client, client-to-server, server-to-client, and/or server-to-server. Those skilled in the art will recognize that any number of computing devices 12 (e.g., client devices 16 and/or server devices 18) may be included in the system 10 and in communication over the network 14.

Figure 2:
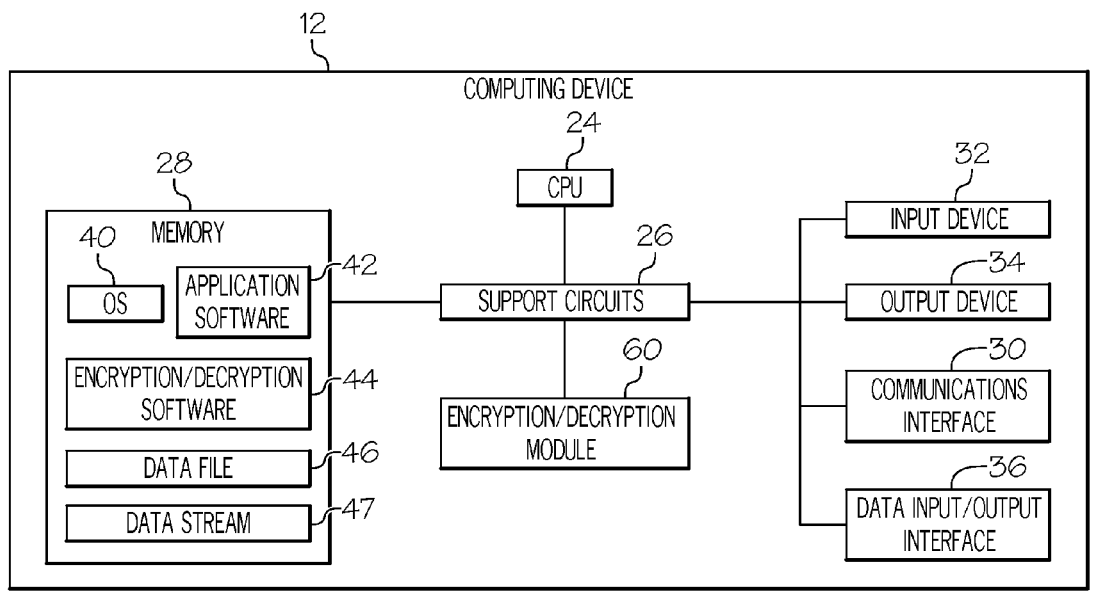
FIG. 2 is a schematic block diagram of one embodiment of the disclosed computing device of FIG. 1.

Referring to FIG. 2, in one embodiment, the computing device 12 may include a central processing unit ("CPU") 24 (also referred to herein as processing unit), support circuits 26, a memory 28, and a communication interface 30. The computing device 12 may also include at least one of an input device 32, an output device 34, and/or a data input/output interface 36.

Those skilled in the art will recognize that the computing device 12 may include more components, fewer components, and/or a different configuration of components than illustrated in FIG. 2.

The CPU 24 may include one or more processors or microprocessors that interpret and execute instructions. The support circuits 26 may include power supplies, clocks, input/output interface circuitry, communication interface circuitry, communication bus circuitry, and the like. The memory 28 may include a random access memory ("RAM"), read only memory ("ROM"), removable disk memory, programmable read-only memory ("PROM"), erasable programmable read-only memory ("EPROM"), electrically erasable programmable read-only memory ("EEPROM"), flash memory, another type of memory, or a combination of these types of memory. The memory 28 may be main memory and may, in part, be used as cache memory or buffer memory.

The communication interface 30 may include any device that permits communication of data between computer devices 12, such as over the network 14. As one example, the communication interface 30 may include a network interface controller ("NIC") that connects the computing device 12 to the network 14 (e.g., via an Ethernet connection, a cellular connection, or a Wi-Fi connection). As another example, the communication interface 30 may include any network or application protocols or services including, but not limited to, Transmission Control Protocol/Internet Protocol ("TCP/IP"); client-server protocols; Time and Date Services; Address Resolution Protocols ("ARP"); User Datagram Protocol ("UDP"); Multicasting protocols; Domain Name Service ("DNS") protocols; Remote login protocols (e.g., TELNET and Rlogin); Application and File Transfer Protocols (e.g., File Transfer Protocol ("FTP"), Trivial File Transfer Protocol ("TFTP"), and Network File System ("NFS")); Email applications (e.g., Simple Mail Transfer Protocol ("SMTP") and Multipurpose Internet Mail Extensions ("MIME")); and Internet Management protocols (e.g., Simple Network Management Protocol ("SNMP") and SNMP2).

The input device 32 may include any device that permits a user 20 to input information to the computing device 12 including, but not limited to, a keyboard, a keypad, a mouse, a pen, a microphone, a touchscreen display, and the like. The output device 34 may include any device that outputs information to the user 20 including, but not limited to, a display, a speaker, a gaming port, and the like. The data input/output interface 36 may include any device that permits data to be transmitted to and/or received by the computing device 12 such as a data port that is connected to an external device (e.g., an external hard drive, an optical disk drive, a flash memory drive, digital-to-analog, or analog to digital converter, etc.).

The memory 28 may store various software packages, such as an operating system ("OS") 40, application software 42, and/or encryption/decryption software 44. The operating system 40 may be any software that manages the hardware resources of the computing device 12 and provides common services for other programs (e.g., application software 42 and/or encryption/decryption software 44). The application software 42 may include, but is not limited to, web browsing software, database software, word processing software, electronic mail software, point-of-sale software, application services (e.g., time of day or date services), and the like. The application software 42 may store data in one or more associated data files 46 (e.g., data at rest) or may generate data as one or more data streams 47 (e.g., data in motion).

In one embodiment, software instructions (e.g., the encryption/decryption software 44) may be executed by the CPU 24 to implement the steps and/or operations described herein below. The encryption/decryption software 44 may take the form of a computer program product embodied in one or more computer readable mediums having computer readable program code embodied thereon. As used herein, the term "computer-readable medium" may refer to any medium that participates in providing instructions to the CPU 24 for execution. Any combination of one or more computer readable mediums may be utilized. As one example, the computer readable medium may include a computer readable storage medium, such as a non-transitory computer readable storage medium (e.g., the memory 28).

The computing device 12 may perform certain operations in response to the CPU 24 executing software instructions contained in the computer-readable medium, such as the memory 28. The software instructions may be read into the memory 28 from another computer-readable medium or from another system and/or device, for example, via the communication interface 30, the input device 32, and/or the data input/output interface 36. The software instructions contained in the memory 28 may cause the CPU 24 to perform some or all of the operations described herein below.

Alternatively, or additionally, hardwired circuitry may be used in place of or in combination with the software instructions (e.g., the encryption/decryption software 44) to implement the steps and/or operations described herein below. As one example, the computing device 12 may include an encryption/decryption module 60. For example, the encryption/decryption module 60 may include, but is not limited to, an application-specific integrated circuit ("ASIC"), a field-programmable gate array ("FPGA"), or the like.

Thus, implementations of the disclosed method 100 (FIG. 3) described herein below are not limited to any specific combination of hardware circuitry and/or software instructions. As used herein, an encryptor 62 (FIG. 5) may include the encryption/decryption software 44, the encryption/decryption module 60, or any combination of the encryption/decryption software 44 and/or the encryption/decryption module 60. As used herein, a decryptor 64 (FIG. 5) may include the encryption/decryption software 44, the encryption/decryption module 60, or any combination of the encryption/decryption software 44 and/or the encryption/decryption module 60.

Figure 3:
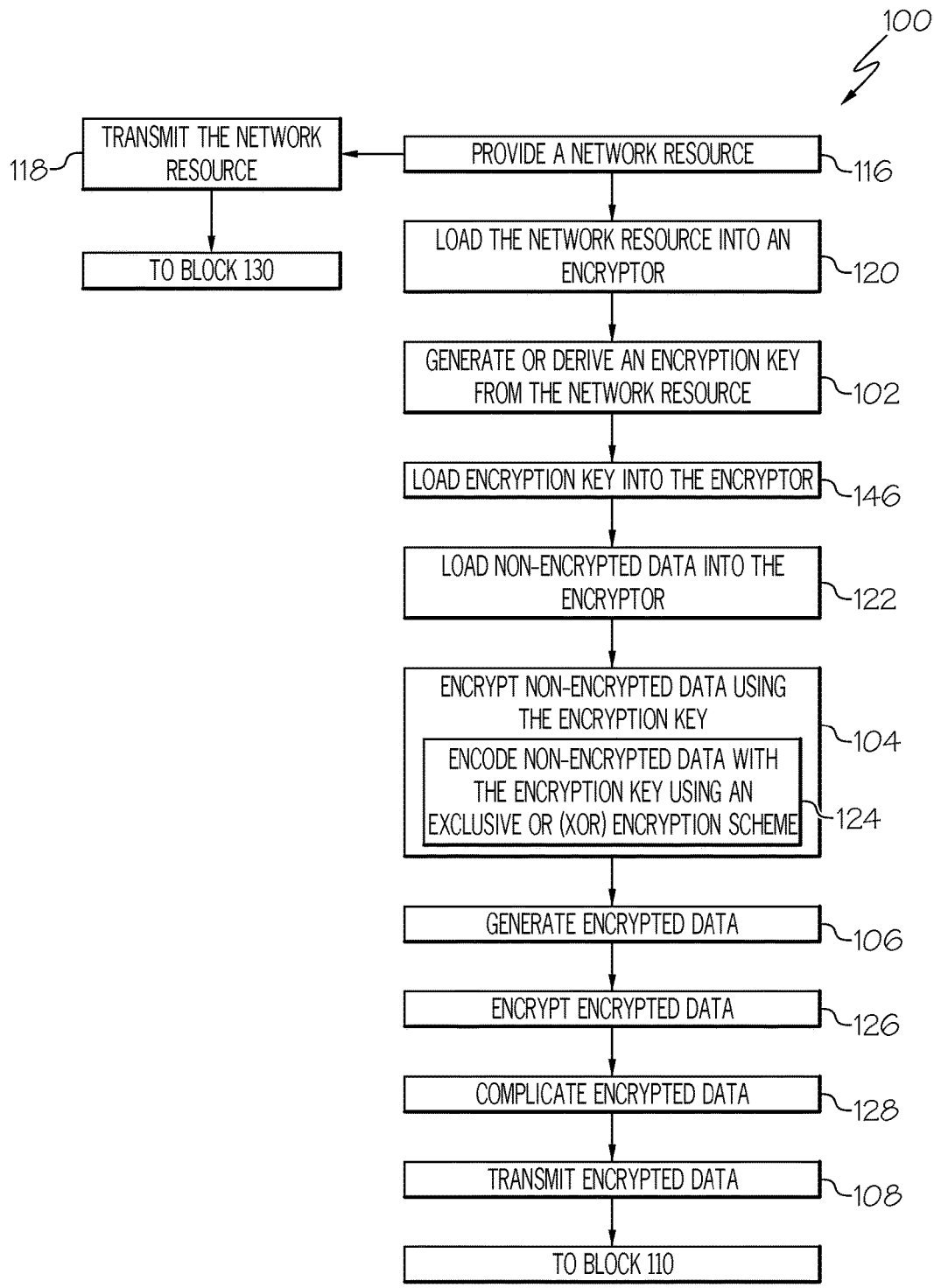
FIG. 3 is a flow diagram of one embodiment of the disclosed method for encrypting data.
Figure 4:
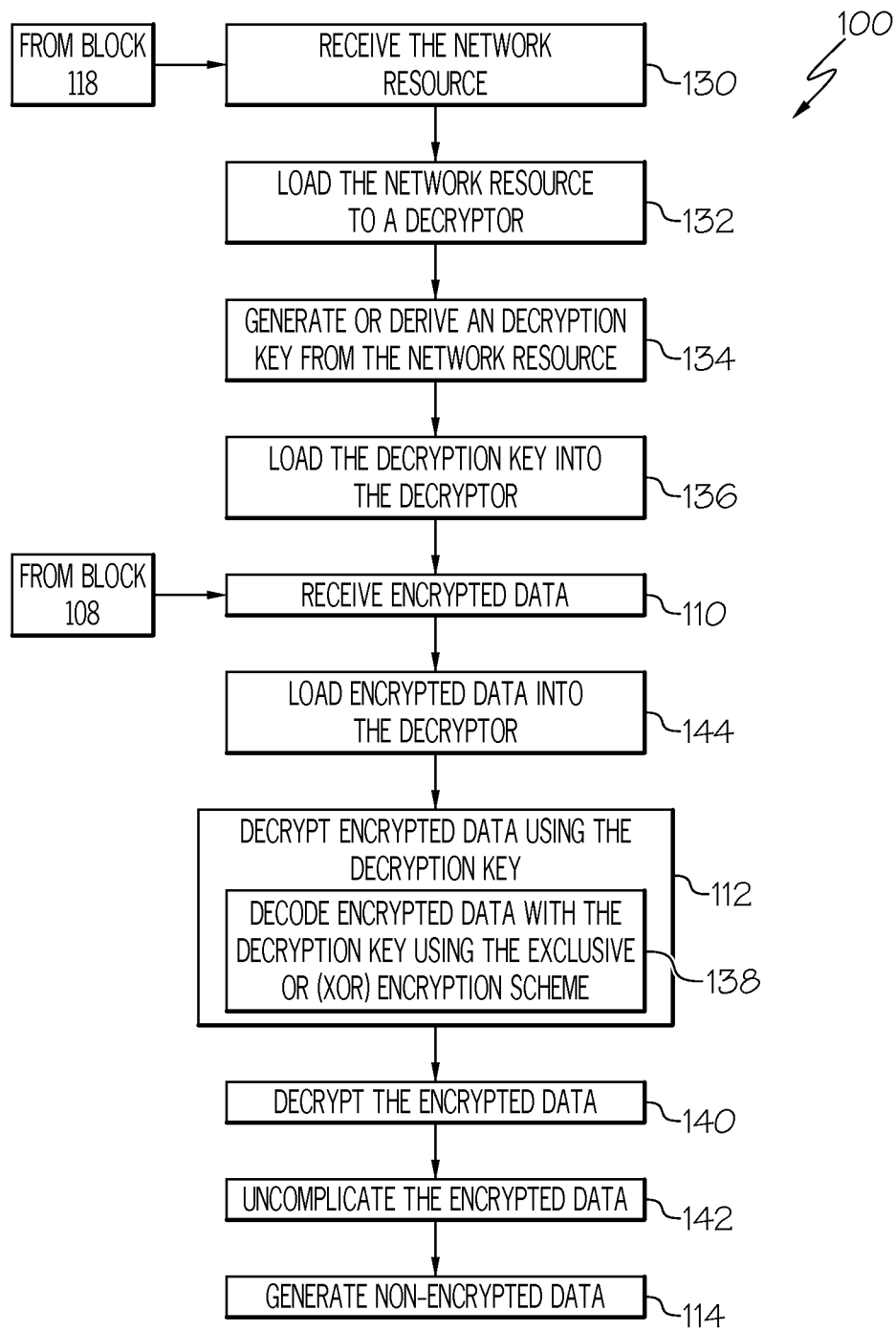
FIG. 4 is a flow diagram of one embodiment of the disclosed method for decrypting data.

Referring to FIGS. 3 and 4, the disclosed method, generally designated 100, for encrypting data, decrypting data, and/or communicating encrypted data may include a series of operational steps (e.g., instructions) implemented by the computing device 12 and executed by one or more computer program products (e.g., encryption/decryption software 44) and/or hardware (e.g., encryption/decryption module 60).

Figure 5:
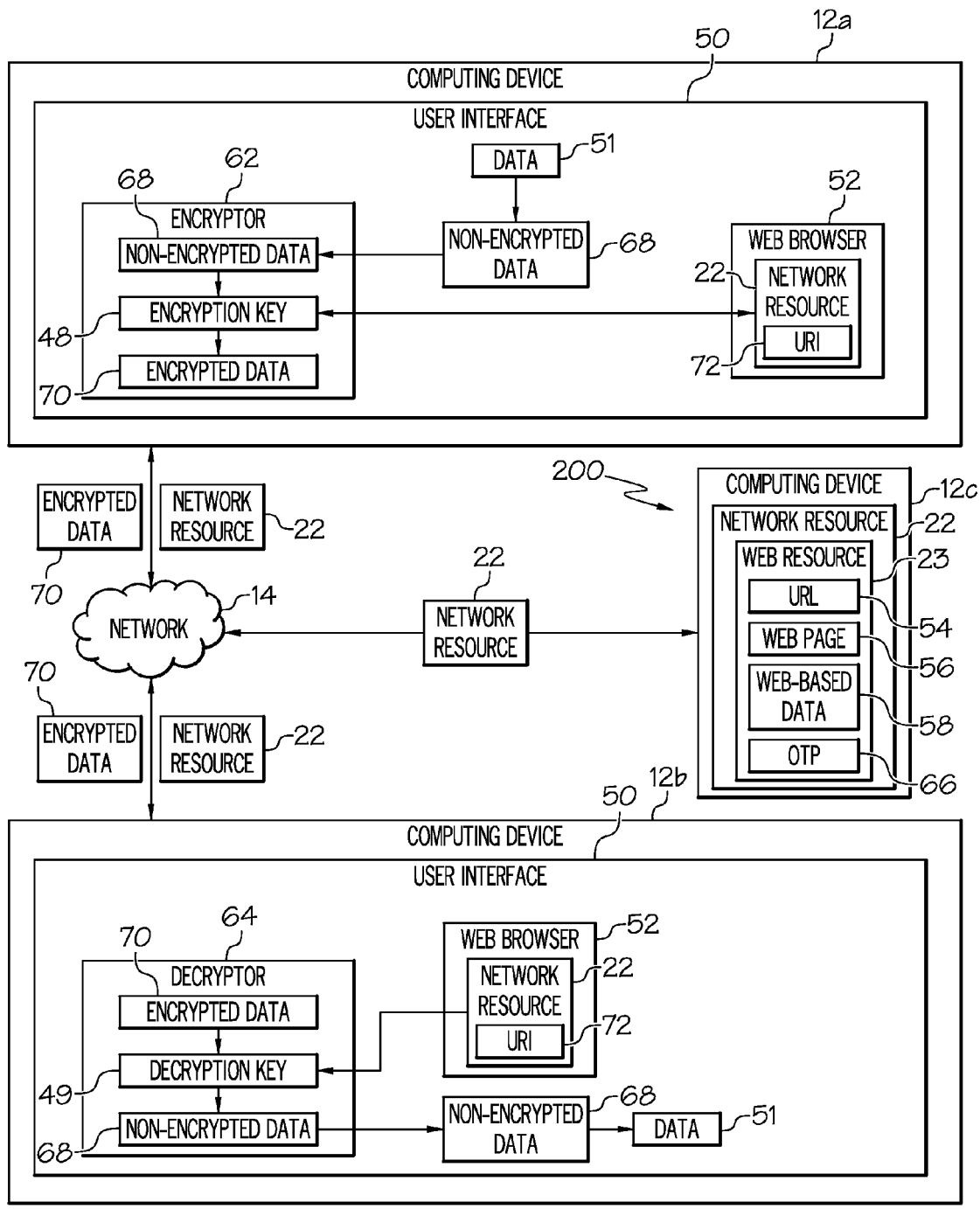
FIG. 5 is a schematic block diagram of one embodiment of the operating environment implementing the disclosed methods represented in FIGS. 3 and 4.

Referring to FIGS. 3 and 4, and with reference to FIG. 5, in one embodiment, the disclosed method 100 may include generating (e.g. deriving) an encryption key 48 from the network resource 22, as shown at block 102; encrypting (e.g., by a first computing device 12a) data 51 (e.g., a data file 46 and/or a data stream 47), such as non-encrypted data 68 or encrypted data 70 using the encryption key 48, as shown at block 104; generating encrypted data 70, as shown at block 106; transmitting (e.g., by the first computing device 12a) the encrypted data 70, as shown at block 108; receiving the (e.g., by a second computing device 12b) the encrypted data 70, as shown at block 110; decrypting (e.g., by the second computing device 12b) the encrypted data 70 using a decryption key 49, as shown at block 112; and generating the non-encrypted data 68 (e.g., decrypted data), as shown at block 114.

As used herein, generating encrypted data 70 and/or generating non-encrypted data 68 (e.g., decrypted data) may include any process or operation that produces, yields, achieves, or otherwise creates encrypted data 70 and/or non-encrypted data 70, respectively.

In one example implementation, the encryption key 48 and the decryption key 49 may be the same. In another example implementation, the encryption key 48 and the decryption key 49 may be different.

Referring to FIG. 5, one embodiment of an example operating environment, generally designated 200, in which the disclosed system 10 and method 100 may be implemented may include the first (e.g., transmitting) computing device 12a, the second (e.g., receiving) computing device 12b, and a third (e.g., web-hosting or network hosting) computing device 12c in communication with one another, for example, over the network 14.

As one example, the first computing device 12a and the second computing device 12b may be client devices 16 and the third computing device 12c may be a server device 18, as described herein above. The first computing device 12a and the second computing device 12b may include a user interface 50. The user interface 50 may be any graphical user interface that allows the user 20 to interact with the computing device 12a, 12b, application software 42 (FIG. 2), and/or the encryptor 62 and decryptor 64, for example, via a display on the output device 34 (FIG. 2). As one example, the application software 42 may include a web browser 52 for entering information and/or retrieving, presenting, and/or traversing network resources 22, for example, information resources, web resources, or cloud-based services such as on the World Wide Web. As another example, the user interface 50 may interact with the application software 42 and/or the communications interface 30 to access the network resources 22 using network or application protocols or services including, but not limited to, for example, TCP/IP; client-server protocols; Time and Date Services; ARP; UDP; Multicasting protocols; DNS protocols; Remote login protocols (e.g., TELNET and Rlogin); Application and File Transfer Protocols (e.g., FTP, TFTP, NFS); Email applications (e.g., SMTP and MIME); and Internet Management protocols (e.g., SNMP and SNMP2).

Referring to FIG. 3, and with reference to FIG. 5, the network resource 22 may be provided to the first computing device 12a, as shown at block 116. In an example embodiment, the network resource 22 may be a web resource 23, a cloud-based resource, network services, application services, or any other network-oriented services or information. As one example, the web resource 23 may be selected from any web-based information available on the World Wide Web. In one example implementation, the computing device 12 (e.g., via the encryptor 62) may automatically and/or randomly select the network resource 22 and provide the network resource 22 to the encryptor 62. In another example implementation, the user 20 of the computing device 12 may select the network resource 22 and provide the network resource 22 to the encryptor 62.

Referring to FIG. 5, the network resource 22 may include any network-based or web-based content, element, location, and/or address, for example, identified by a uniform resource identifier ("URI") 72 (e.g., a web address) and/or any network-based content, element, location, and/or address, for example, identified by network-based identifier (e.g., network address). In one example implementation, the network resource 22 (e.g., network-based resource or web-based resource) may include mapping and/or addressing to another network resource 22 and/or web resource 23 (e.g., network-based resource or web-based resource). For example, accessing the network resources 22 may use any network or application protocols for transfer of data, non-encrypted data, encrypted data, encryption keys, decryption keys, and any other relevant information. In another example implementation, the network resource 22 (e.g., network-based resource or web-based resource) may be stored on the third computing device 12c. For example, the network resource 22 may be hosted by the server device 18 (e.g., a network server or web server).

As one example, the network resource 22 (e.g., the web resource 23) may include a uniform resource locator ("URL") 54. The URL 54 may include a string of characters representing a web page address (e.g., www.abc123.com) of the web resource 23 or a network address of the network resource 22. The URL 54 may be used to define, derive, and/or generate the encryption key 48 and/or the decryption key 49, and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68).

As used herein, to complicate data 51 (e.g., encrypted data 70 or non-encrypted data 68) may include any process or operation that makes the data more complex, intricate, involved, or difficult. As used herein, to uncomplicate data 51 (e.g., encrypted data 70 or non-encrypted data 68) may include any process or operation that makes the data less complex, less intricate, less involved, or less difficult.

In one example implementation the network resource 22 (e.g., web-resource 23) providing to the encryptor 62 the encryption key 48, and/or any information used to generate encrypted data 70, and/or any information used to complicate data 51 (e.g., encrypted data 70 or non-encrypted data 68), may be the same network resource 22 that provides to the decryptor 64 the decryption key 49, and/or any information used to decrypt encrypted data 70, and/or any information used to uncomplicate data 51 (e.g., encrypted data 70 or non-encrypted data 68). In another example implementation the network resource 22 providing to the encryptor 62 the encryption key 48, and/or any information used to generate encrypted data 70, and/or any information used to complicate data 51 (e.g., encrypted data 70 or non-encrypted data 68), may be a different network resource 22 than provides to the decryptor 64 the decryption key 49, and/or any information used to decrypt encrypted data 70, and/or any information used to uncomplicate data 51 (e.g., encrypted data 70 or non-encrypted data 68). In yet another example implementation, the encryption key 48 and/or decryption key 49 and/or any information used to generate encrypted data 70, decrypt encrypted data 70, complicate data 51, or uncomplicate data 51 may include (e.g., be composed of) information derived from multiple different network resources 22.

As another example, the network resource 22 (e.g., the web resource 23) may include a web page 56 itself and/or at least a portion of the contents of the web page 56. The web page 56 may be any web data (e.g., web content and/or web document) located at a particular URL 54 (e.g., having a URI 72) and that is suitable for the World Wide Web and display on the web browser 52. For example, the web page 56 may include, but is not limited to, textual information, non-textual information (e.g., images and/or graphics), and the like. The web page 56 may be a static web page or a dynamic web page. The web page 56 may be used to define, derive, and/or generate the encryption key 48 and/or the decryption key 49.

As another example, the network resource 22 may include network-based data (e.g., the web resource 23 may include web-based data 58). The web-based data 58 (e.g., network-based data) may be any native data contained within a webpage 56, contained at a network address, and/or located at a particular URL 54 (e.g., having a URI 72). For example, the web-based data 58 may include, but is not limited to, a text file, an image file, an audio file (e.g., static or streaming), a video file (e.g., static or streaming), and the like. The web-based data 58 may be used to define, derive, and/or generate the encryption key 48. Network-based data may include similar types of data hosted on a network server or drive.

As another example, the network resource 22 may be a one-time pad ("OTP") 66 stored, for example, on a web page 56, on a network server and/or drive, and/or located at a particular URL 54 (e.g., having a URI 72). For example, the OTP 66 may be a data file or data stream uploaded to the web page 56 for the intended purpose of being used to define, derive, and/or generate the encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68).

As yet another example, the network resource 22 may be or may include non-predictive information or values that are not known in advance of being used to define, derive, and/or generate the encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68). As one example, such non-predictive information or values may include stock market prices.

A new and/or different (e.g., refreshed) encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68) may be generated (e.g., derived), for example, from the selected network resource 22 (e.g., web resource 23) and used to encrypt and decrypt data 51 each time the disclosed method 100 is implemented. Additionally, since the encryption key 48 and/or decryption key 49 and/or any information used to generate encrypted data 70, decrypt encrypted data 70, complicate data 51, or uncomplicate data 51 may be generated from any available web resource 23, an extremely large number and continually growing number of possible encryption keys 48 and/or decryption keys 49 may be available (e.g., over one billion available possibilities as of this disclosure just for encryption key 48 and/or decryption key 49 sources).

Furthermore, when the encryption key 48 and/or decryption key 49 is generated from the web page 56, the web-based data 58, the OTP 66, and/or a combination thereof, the key size (e.g., the key length measured in bits) may be massive. For example, a massive encryption key 48 may include a key size substantially larger than traditional large asymmetric encryption keys (e.g., 128-bit key, 256-bit key, 512-bit key, 1024-bit key, etc.). As one example, the massive encryption key 48 and/or decryption key 49 may include key size greater than a 2,048-bit key, for example, currently considered a very large key size. As another example, the massive encryption key 48 and/or decryption key 49 may include at least a 10 GigaByte key, for example, derived from a random or non-random encoded hard drive or server. As yet another example, the massive encryption key 48 and/or decryption key 49 may include at least a 72 Terabit key, for example, derived from a two hour high definition video streaming at 10 Gigabits per second.

Alternatively, as one example, a small encryption key 48 and/or decryption key 49 of fifty characters or less may be derived to encode a short email or a text message.

Thus, continually refreshing the encryption key 48 and/or decryption key 49, the extremely large number of possible keys that can be derived from the extremely large number of network nodes and/or web sites, and/or the massive potential key sizes may significantly increase the difficulty of breaking (i.e., "hacking") the encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68).

Referring to FIG. 3, and with reference to FIG. 5, the network resource 22 may be loaded into the encryptor 62, as shown at block 120. In one example implementation, the network resource 22 (e.g., web resource 23) may be loaded and/or viewed on the web browser 52 of the first computing device 12a and the encryptor 62 may capture and/or load the network resource 22 from the web browser 52. As one example, the URI 72 of the network resource 22 (e.g., the URL 54, the web page 56, the web-based data 58, the OTP 66, the non-predictive information or values, and/or any information used to generate encrypted data 70, decrypt encrypted data 70, complicate data 51, or uncomplicate data 51) may be loaded into the web browser 52 of the first computing device 12a, access to the network resource 22 may be requested by the first computing device 12a from the third computing device 12c, and the network resource 22 may be received (e.g., downloaded) by the first computing device 12a (e.g., by the web browser 52).

In another example implementation, the network resource 22 (e.g., a network-based resource or a web-based resource) may be loaded directly (e.g., as input data) into the encryptor 62 from the web browser 52. As one example, the encryptor 62 may pull the network resource 22 from browsing data of the web browser 52 once the network resource 22 has been received. The encryptor 62 may have access to and be in communication with the web browser 52.

In yet another example implementation, the user 20 of the first computing device 12a may input (e.g., manually input and/or automatically input) the network resource 22 (e.g., the URI 72) into the encryptor 62.

Generating, defining, and/or deriving the encryption key 48 (also referred to herein as a first encryption key) from the network resource 22 (block 102) may be performed in whole or in part by the encryptor 62. In one example embodiment, the CPU 24 (FIG. 2) may execute instructions provided by the encryption/decryption software 44 to generate (e.g., derive) the encryption key 48 (e.g., the first encryption key) defined by the network resource 22. In another example embodiment, the encryption/decryption module 60 may generate the encryption key 48 (e.g., the first encryption key) defined by the network resource 22. The encryption key 48 generated by the encryptor 62 may specify a particular transformation of non-encrypted data 68 (e.g., plaintext) to encrypted data 70 (e.g., ciphertext) during an encryption operation.

As shown at block 146, the encryption key 48 may be loaded into the encryptor 62. As one example, the encryption key 48 generated (e.g., derived) from the network resource 22 (e.g., network-based resource or web-based resource) by the encryptor 62 (block 102) may be automatically loaded into the encryptor 62.

As shown at block 122, the non-encrypted data 68 may be loaded into encryptor 62. The non-encrypted data 68 may be selected from any data 51 (FIG. 5), such as a data file 46 or data stream 47 (FIG. 2). For example, the data 51 may include, but is not limited to, an electronic mail file (e.g., email), a text file (e.g., a document), an audio file, a video file, an image file, a real-time voice stream (e.g., a phone call), a real-time video camera stream, flight control information, military or defense communications, and the like.

Figure 6:
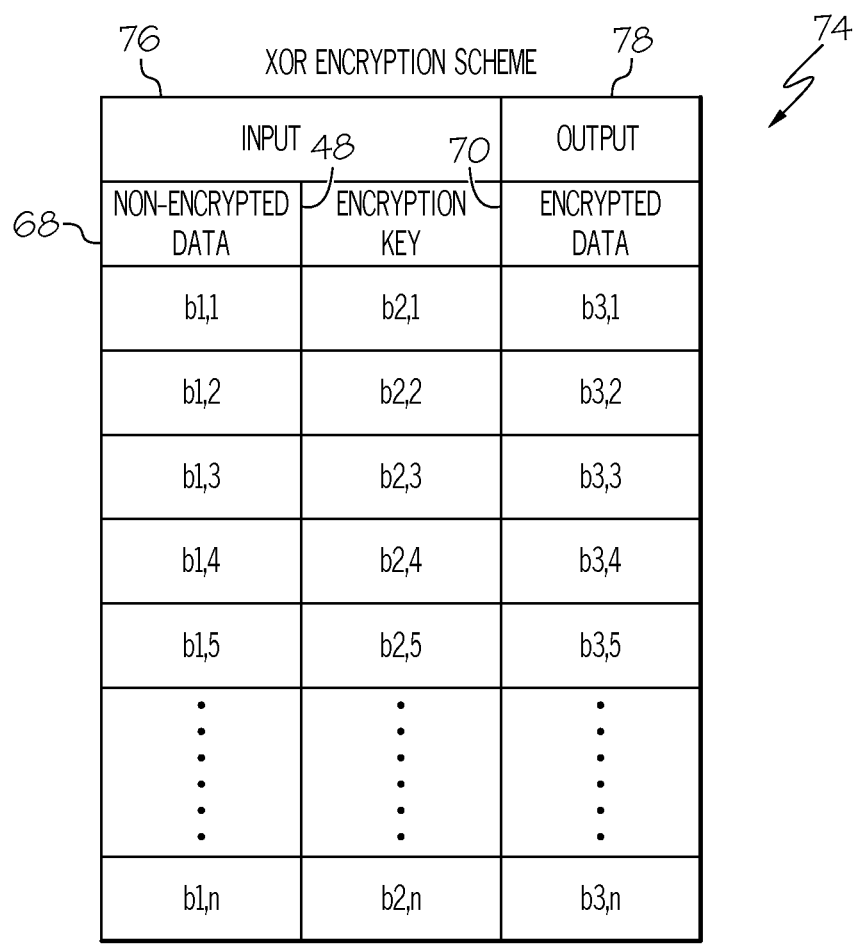
FIG. 6 is a schematic illustration of one embodiment of the exclusive or encryption scheme, which may be used to encrypt data.

Referring to FIG. 3, and with reference to FIGS. 5 and 6, in one example implementation, encrypting the data 51 (e.g., the non-encrypted data 68) using the encryption key 48 (block 104) may include encoding the non-encrypted data 68 with the encryption key 48 using an exclusive or ("XOR") encryption scheme 74, as shown at block 124, to generate the encrypted data 70 (block 106).

The operation shown at block 104 describes encrypting non-encrypted data 68 to generate encrypted data 70. However, the operation shown at block 104 may include encrypting any data 51 (e.g., non-encrypted data 68 or encrypted data 70). For example, previously encrypted data may be further encrypted under the operation shown at block 104, as described herein.

Referring to FIG. 6, as one example, the XOR encryption scheme 74 used to encrypt the non-encrypted data 68 may include one or more bits of data (e.g., b1,1-b1,n) of the non-encrypted data 68 and one or more bits of data (b2,1-b2,n) of the encryption key 48 as input 76. The encryptor 62 may use an exclusive or function (e.g., logic operation) to generate one or more bits of data (b3,1-b3,n) of the encrypted data 70 as output 78. The bits of data of the non-encrypted data 68 may be encrypted with the encryption key 48 bit-by-bit, in batches of bits, or as a bit stream.

Thus, the XOR encryption scheme 74 may provide a symmetric and single cycle computational operation to encrypt the non-encrypted data 68 using the encryption key 48 generated from the network resource 22.

Referring to FIG. 3, in one embodiment, the method 100 may include performing one or more additional and/or alternative encrypting and/or data complication operations to provide further difficulty in breaking the encryption.

In one example implementation, the non-encrypted data 68 and/or the encrypted data 70 may be alternatively and/or additionally encrypted using standard encryption (e.g., using an alternative or additional encryption algorithm), as shown at block 126. As one example, the standard encryption may include, but is not limited to, symmetric encryption (e.g., Advanced Encryption Standard ("AES") or Data Encryption Standard ("DES")), asymmetric encryption (e.g., public-key/private-key encryption), or any other type of encryption such as authentication encryption, hashing, or the like. Information to alternatively and/or additionally encrypt using standard encryption (e.g., using an alternative or additional encryption algorithm), as shown at block 126, may be generated or derived from the network resources 22 in the same manner as described herein.

In one example implementation, the non-encrypted data 68 and/or the encrypted data 70 may be alternatively and/or additionally complicated using a mathematical function, as shown at block 128. As one example the mathematical function may be any mathematical function configured to mix, flip, shift, swap, transform, add, replace, hash, and/or delete characters and/or bits. Information to alternatively and/or additionally complicate using a mathematical function, as shown at block 128, may be generated or derived from the network resources 22 in the same manner as described herein.

The additional encryption and/or data complication operations (blocks 126 and 128) may be performed on the non-encrypted data 68 prior to encryption using the encryption key 48 generated (e.g., derived) from the network resource 22 and/or may be performed on the encrypted data 70 following encryption using the encryption key 48 generated from the network resource 22.

Referring to FIG. 3, and with reference to FIG. 5, in one example implementation, transmitting the encrypted data 70 (block 108) may include transmitting the encrypted data 70 from the first computing device 12*a* (e.g., a transmitting computing device) to the second computing device 12*b* (e.g., a receiving computing device), for example, over the network 14. As one example, the encrypted data 70 may be transmitted via the communication interface 30 (FIG. 2) of the first computing device 12*a*. For example, the encrypted data 70 may be packetized (i.e., broken into packets) and designated for transmission (e.g., addressed) to the second computing device 12*b* over the network 14 by the communication interface 30 of the first computing device 12*a*.

Referring to FIG. 3, and with reference to FIG. 5, in one embodiment, the method 100 may include transmitting the network resource 22 (e.g., network-based resource or web-based resource), as shown at block 118. In one example implementation, the network resource 22, used to define, generate, and/or derive the encryption key 48, may be transmitted from the first computing device 12*a* to the second computing device 12*b* (e.g., shared with the second computing device 12*b*). As one example, transfer of the network resource 22 may be performed prior to transfer of the encrypted data 70 (e.g., block 108). As another example, transfer of the network resource 22 may be performed after transfer of the encrypted data 70 (e.g., block 108). As another example, transfer of the network resource 22 may be performed separately from transfer of the encrypted data 70 (e.g., block 108).

In one example implementation, the network resource 22 may be kept private (e.g., kept secret from unauthorized third-parties). As one example, the network resource 22 may be encrypted prior to being transmitted (e.g., shared) with the second computing device 12*b*, for example, using symmetric encryption or asymmetric encryption (e.g., public-key/private-key encryption).

In one example implementation, the network resource 22 may be transmitted (e.g., shared) from the user 20 of the first computing device 12*a* (e.g., a key-providing user) to the user 20 of the second computing device 12*b* (e.g., a key-receiving user). As one example, the network resource 22 may be provided to the key-receiving user directly by the key-providing user, for example, through an out-of-band communication.

Referring to FIG. 4, and with reference to FIG. 5, in one embodiment, the method 100 may include receiving the network resource 22 (network-based resource or web-based resource), as shown at block 130. In one example implementation, when the network resource 22 is encrypted prior to transmission, the network resource 22 may be decrypted following receipt.

As shown at block 132, the network resource 22 may be loaded into the decryptor 64, as shown at block 132. In one example implementation, the network resource 22 may be loaded and/or viewed on the web browser 52 of the second computing device 12*b* and the decryptor 64 may capture and/or load the network resource 22 from the web browser 52 in a substantially similar manner as described herein above and as shown at block 120.

As shown at block 134, the decryption key 49 may be generated (e.g., derived), by the second computing device 12*b*, from the network resource 22 for use to decrypt the encrypted data 70. Generating the decryption key 49 (also referred to as a second encryption key) from the network resource 22 (block 134) may be performed in whole or in part by the decryptor 64. In one example implementation, generating the decryption key 49 may include generating a decryption key 49 that is different than the encryption key 48 (e.g., the first encryption key and the second encryption key are different). In another example implementation, generating the decryption key 49 may include regenerating the encryption key 48 (e.g., the first encryption key and the second encryption key are the same). As one example, the decryption key 49 (e.g., the second encryption key) generated by the decryptor 64 may be the same as (e.g., match) the encryption key 48 (e.g., the first encryption key) generated by the encryptor 62. As another example, the decryption key 49 (e.g., the second encryption key) generated by the decryptor 64 may be an inverse of the encryption key 48 (e.g., the first encryption key) generated by the encryptor 62. As another example, the encryption key 48 (e.g., the first encryption key) may be asymmetric to the decryption key 49 (e.g., the second encryption key).

In one example embodiment, the CPU 24 may execute instruction provided by the encryption/decryption software 44 to generate the decryption key 49 defined by the network resource 22. As another example embodiment, the encryption/decryption module 60 may generate the decryption key 49 defined by the network resource 22. The decryption key 49 may specify the particular transformation of the encrypted data 70 (e.g., ciphertext) to the non-encrypted data 68 (e.g., plaintext) during a decryption operation.

As shown at block 136, the decryption key 49 may be loaded into decryptor 64. As one example, the decryption key 49 generated (e.g., derived) from the network resource 22 (e.g., network-based resource or web-based resource) by the decryptor 64 (block 134) may be automatically loaded into the encryptor 62.

In one example implementation, receiving the encrypted data 70 (block 110) may include receiving the encrypted data 70 by the second computing device 12*b* sent from the first computing device 12*a*, for example, over the network 14. As one example, the encrypted data 70 may be received via the communication interface 30 of the second computing device 12*b*. For example, the encrypted data 70 may be de-packetized by the communication interface 30 of the second computing device 12*b*.

Figure 7:
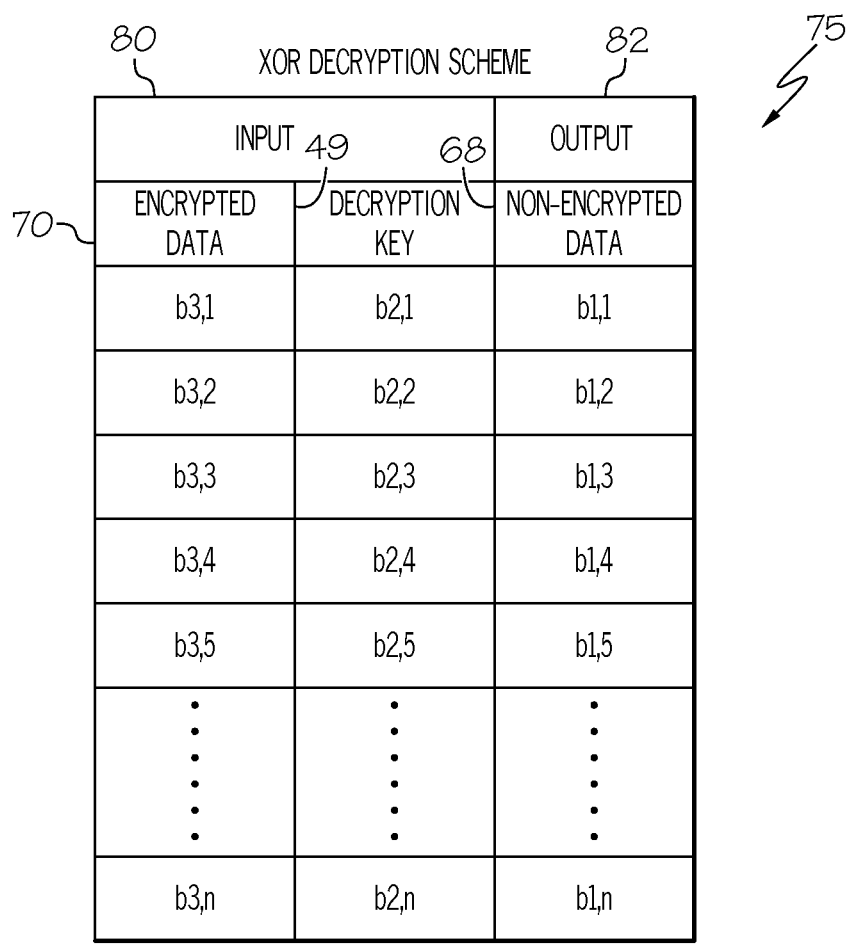
FIG. 7 is a schematic illustration of the exclusive or decryption scheme, which may be used to decrypt data.

Referring to FIG. 4, and with reference to FIGS. 5 and 7, the encrypted data 70 may be loaded into the decryptor 64, as shown at block 144. In one example implementation, decrypting the encrypted data 70 using the decryption key 49 (block 112) may include decoding the encrypted data 70 with the decryption key 49 using the exclusive or ("XOR") decryption scheme 75, as shown at block 138, to generate the non-encrypted data 68 (e.g., decrypted data) (block 114).

Referring to FIG. 7, as one example, the XOR decryption scheme 75 used to decrypt the encrypted data 70 may include one or more bits of data (e.g., b3,1-b3,n) of the encrypted data 70 and one or more bits of data (b2,1-b2,n) of the decryption key 49 as input 80. The decryptor 64 may use the exclusive or ("XOR") function to generate one or more bits of data (b1,1-b1,n) of the non-encrypted data 68 as output 82. The bits of data of the encrypted data 70 may be decrypted with the decryption key 49 bit-by-bit, in batches of bits, or as a bit stream.

Thus, the XOR encryption scheme 74 may provide a symmetric and single cycle computational operation to decrypt the encrypted data 70 using the decryption key 49 generated from the network resource 22.

Referring to FIG. 4, in one embodiment, the method 100 may include performing one or more alternative and/or additional decrypting and/or data complication reversing operations to undo the operations described at blocks 126 and/or 128.

In one example implementation, the encrypted data 70 and/or the non-encrypted data 68 may be alternatively and/or additionally decrypted using standard decryption (e.g., using an alternative and/or additional decryption algorithm), as shown at block 140 and may be generated or derived from the network resources 22 in the same manner as described herein. As one example, the standard decryption may include, but is not limited to, symmetric decryption (e.g., Advanced Encryption Standard ("AES") or Data Encryption Standard ("DES")), asymmetric decryption (e.g., public-key/private-key decryption), and/or any other type of decryption such as authentication decryption, or the like corresponding to the standard encryption described at block 126.

In one example implementation, the data complications of the encrypted data 70 and/or the non-encrypted data 68, as described at block 128, may be uncomplicated (e.g., the complications my be reversed) using an inverse of the mathematical function, as shown at block 142. As one example the mathematical function may be any mathematical function configured to mix, flip, shift, swap, transform, add, replace, hash, and/or delete characters and/or bits in order to reverse the operation shown at block 128. Information to uncomplicate the encrypted data 142 may be generated or derived from the network resources 22 in the same manner as described herein.

The additional decryption and/or data complication reversing operations (blocks 140 and 142) may be performed on the encrypted data 70 prior to decryption using the decryption key 49 generated (e.g., derived) from the network resource 22 and/or may be performed on the non-encrypted data 68 following decryption using the decryption key 49 generated from the network resource 22.

While the disclosed method 100 is described in terms of communicating (e.g., transmitting) encrypted data between two or more computing devices 12 (e.g., data in motion), those skilled in the art will recognize that the steps and/or operations described herein may also be implemented to communicate and store encrypted data on a storage device or other storage medium (e.g., a hard drive, a portable storage memory, an optical disc, server storage, cloud-based storage, and the like, e.g., data at rest) for long or short-term backup storage and retrieval of the encrypted data 70. The encrypted data 70 may be decrypted at the receiving computing device 12 or off of (e.g., from) the data storage device via the decryptor 64.

Since the selected network resource 22 used to generate the encryption key 48 and/or the decryption key 49 may change over time (e.g., the content of the web page 56 and/or the web-based data 58 may change or be removed), the network resource 22 may be stored in storage memory (e.g., memory 28 of the computing device 12 or another storage device). The network resource 22 may be encrypted, for example as described herein above, prior to storage.

Accordingly, the disclosed system 10, computing device 12 and method 100 may reduce processing overhead and time (e.g., processing power, cycle time and/or duration) needed to encrypt and/or decrypt a data as well as greatly increasing decryption difficulty.

Although various embodiments of the disclosed device, system and method have been shown and described, modifications may occur to those skilled in the art upon reading the specification. The present application includes such modifications and is limited only by the scope of the claims.

What is claimed is:

1. A computer-implemented method for encrypting non-encrypted data, said method comprising:
receiving, by a client device, a streaming multimedia file from at least one Internet location stored on a server device in communication with said client device;
selecting bits of data from said streaming multimedia file as said streaming multimedia file is being received by said client device, a number of said bits of data selected from said streaming multimedia file being at least as large as said non-encrypted data to be encrypted;
using said bits of data selected from said streaming multimedia file as an encryption key; and
encrypting said non-encrypted data with said encryption key bit-by-bit using a symmetric, single cycle computational encryption operation to produce encrypted data as each one of said bits of data is being selected from said streaming multimedia file.

2. The method of claim 1 wherein said non-encrypted data comprises at least one of a data file and a data stream.

3. The method of claim 2 wherein said data stream is a real-time data stream.

4. The method of claim 1 wherein said symmetric, single cycle computational encryption operation comprises encoding said non-encrypted data with said encryption key using an exclusive or encryption scheme.

5. The method of claim 4 further comprising complicating at least one of said non-encrypted data and said encrypted data by at least one of mixing, swapping, transposing, transforming, inverting, flipping, adding, inserting, replacing, hashing, or deleting bits.

6. The method of claim 1 wherein:
said streaming multimedia file comprises at least one of a streaming audio file and a streaming video file,
said encryption key is unique and is not repeated for subsequent encrypting of subsequent non-encrypted data, and
encrypting said non-encrypted data with said encryption key is performed as said non-encrypted data is transmitted to another client device.

7. The method of claim 1 further comprising transmitting said encrypted data to another client device, wherein encrypting said non-encrypted data with said encryption key to produce said encrypted data occurs as said encrypted data is transmitted to said another client device.

8. A computer-implemented method for decrypting encrypted data, said method comprising:
receiving, by a client device, a streaming multimedia file from at least one Internet location stored on a server device in communication with said client device;
selecting bits of data from said streaming multimedia file as said streaming multimedia file is being received by said client device, a number of said bits of data selected from said streaming multimedia file being at least as large as said encrypted data to be decrypted;
using said bits of data selected from said streaming multimedia file as a decryption key; and decrypting said encrypted data with said decryption key bit-by-bit using a symmetric, single cycle computational decryption operation to produce non-encrypted data as each one of said bits of data is being selected from said streaming multimedia file.

9. The method of claim 8 wherein said symmetric, single cycle computational decryption operation comprises decoding said encrypted data with said decryption key using an exclusive or decryption scheme.

10. The method of claim 9 further comprising uncomplicating said encrypted data by at least one of mixing, swapping, transposing, transforming, inverting, flipping, adding, inserting, replacing, hashing, or deleting bits.

11. The method of claim 8 wherein:
said streaming multimedia file comprises at least one of a streaming audio file and a streaming video file,
said decryption key is unique and is not repeated for subsequent decrypting of subsequent encrypted data, and
decrypting said encrypted data with said decryption key is performed as said encrypted data is received from another client device.

12. The method of claim 8 further comprising receiving said encrypted data from another client device, wherein decrypting said encrypted data with said decryption key to produce said non-encrypted data occurs as said encrypted data is received from said another client device.

13. A computing device for electronic data encryption and decryption, said computing device comprising:
a processor; and
a non-transitory memory storing instructions, which, when executed by said processor, cause said processor to perform operations comprising:
using first non-encrypted data;
receiving, by said computing device, a first streaming multimedia file from a first Internet location stored on a first server device, in communication with said computing device, and identifiable by a first Uniform Resource Identifier;
selecting first bits of data from said first streaming multimedia file as said first streaming multimedia file is being received by said computing device, a number of said first bits of data selected from said first streaming multimedia file being at least as large as said first non-encrypted data to be encrypted;
using said first bits of data selected from said first streaming multimedia file as an encryption key;
encrypting said first non-encrypted data using said encryption key bit-by-bit using a symmetric, single cycle computational encryption operation to produce first encrypted data as each one of said first bits of data is being selected from said first streaming multimedia file;
receiving second encrypted data;
receiving, by said computing device, a second streaming multimedia file from a second Internet location stored on a second server device, in communication with said computing device, and identifiable by a second Uniform Resource Identifier;
selecting second bits of data from said second streaming multimedia file as said second streaming multimedia file is being received by said computing device, a number of said second bits of data selected from said second streaming multimedia file being at least as large as said second encrypted data to be decrypted;
using said second bits of data selected from said second streaming multimedia file as a decryption key; and
decrypting said second encrypted data using said decryption key bit-by-bit using a symmetric, single cycle computational decryption operation to produce second non-encrypted data as each one of said second bits of data is being selected from said second streaming multimedia file.

14. The computing device of claim 13 wherein said symmetric, single cycle computational encryption operation comprises encoding said first non-encrypted data with said encryption key using an exclusive or encryption scheme.

15. The computing device of claim 13 wherein said operations further comprise:
complicating at least one of said first non-encrypted data and said first encrypted data by at least one of mixing, swapping, shifting, transposing, transforming, inverting, flipping, adding, inserting, replacing, hashing, or deleting bits, and
uncomplicating said second non-encrypted data by at least one of mixing, swapping, shifting, transposing, transforming, inverting, flipping, adding, inserting, replacing, hashing, or deleting bits.

16. The computing device of claim 13 wherein said operations further comprise transmitting said first encrypted data to another computing device, and wherein said operation of encrypting said first non-encrypted data occurs during said operation of transmitting said first encrypted data.

17. The computing device of claim 13 wherein:
said encryption key is unique to said encrypting operation and is not repeated for a subsequent encrypting operation, and
said decryption key is unique to said decrypting operation and is not repeated for a subsequent decrypting operation.

18. The computing device of claim 13 wherein said symmetric, single cycle computational decryption operation comprises decoding said second encrypted data with said decryption key using an exclusive or decryption scheme.

19. The computing device of claim 13 wherein:
said first streaming multimedia file comprises at least one of a first streaming audio file and a first streaming video file, and
said second streaming multimedia file comprises at least one of a second streaming audio file and a second streaming video file.

20. The computing device of claim 13 wherein at least one of said first non-encrypted data and said second encrypted data comprises a real-time data stream.

21. The computing device of claim 13 wherein said operation of decrypting said second encrypted data occurs during said operation of receiving said second encrypted data.

* * * * *